United States Patent [19]

Martin et al.

[11] Patent Number: 4,969,523

[45] Date of Patent: Nov. 13, 1990

[54] METHOD FOR GRAVEL PACKING A WELL

[75] Inventors: James W. Martin, Missouri City, Tex.; Tommy E. Hudson, Skiatook, Okla.

[73] Assignee: Dowell Schlumberger Incorporated, Tulsa, Okla.

[21] Appl. No.: 365,286

[22] Filed: Jun. 12, 1989

[51] Int. Cl.$^5$ ............................................. E21B 43/04
[52] U.S. Cl. .................................................... 166/278
[58] Field of Search ..................... 166/276, 278, 50, 51

[56] References Cited

U.S. PATENT DOCUMENTS

| | | | |
|---|---|---|---|
| 2,207,334 | 7/1940 | Reynolds et al. | 166/278 |
| 2,905,245 | 9/1959 | De Priester | 166/278 X |
| 2,952,318 | 9/1960 | Ritch | 166/278 |
| 3,362,475 | 1/1968 | Huitt et al. | 166/278 |
| 3,675,717 | 7/1972 | Goins, Jr. et al. | 166/278 |
| 3,891,565 | 6/1975 | Colpoys | 166/278 X |
| 4,548,269 | 10/1985 | Elson et al. | 166/278 X |
| 4,733,729 | 3/1988 | Copeland | 166/278 X |
| 4,796,701 | 1/1989 | Hudson et al. | 166/278 |
| 4,817,717 | 4/1989 | Jennings, Jr. et al. | 166/278 |

*Primary Examiner*—George A. Suchfield
*Attorney, Agent, or Firm*—Stephen A. Littlefield

[57] ABSTRACT

A method of packing a well, particularly an oil, gas or water well comprises injecting a particle/liquid slurry into a wellbore wherein the particles comprise particles of at least two different densities independently selected from the density range of about 0.1 to about 4.0. The at least two different density particles may be injected as blend of different density particles or in a sequential series of slugs, each slug having a single density particle suspended therein. This technique gives substantially equivalent packing efficiency throughout the annulus, perforations and perforation chambers when compared with gravel packing using specialized low to medium density materials.

11 Claims, 1 Drawing Sheet

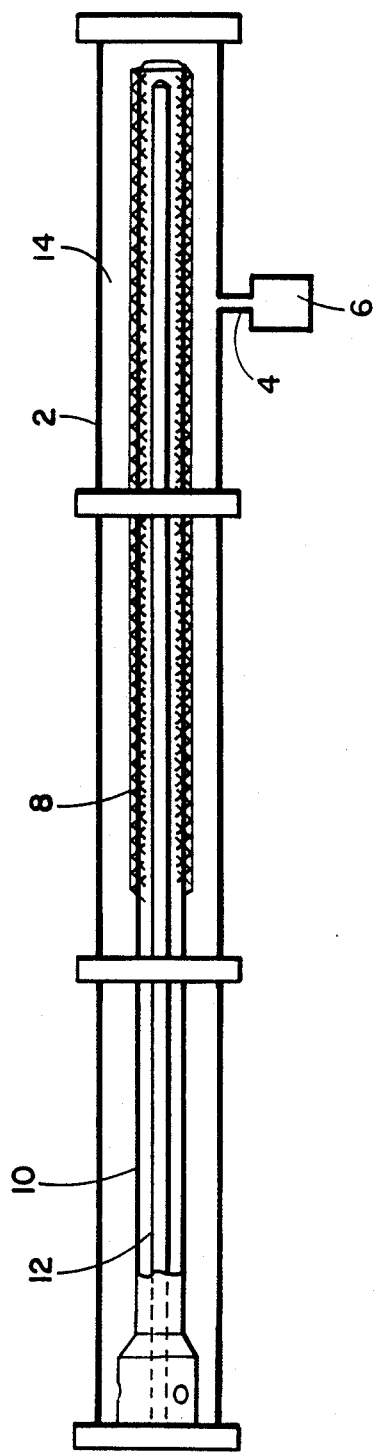

METHOD FOR GRAVEL PACKING A WELL

This invention relates to the art of subterranean well completions and, more particularly, to an improved means and method for placement of a filtering medium in a wellbore annulus and/or perforations which permits the passage of well fluids into the wellbore but restrains the transport into the wellbore of particulate materials present in the formation.

BACKGROUND OF THE INVENTION

The practice of so-called gravel packing a well in order to substantially block the flow of formation particulates into a wellbore while permitting the free flow of formation fluids has long been used. In such a technique, a particulate material is injected between the earth formation and a point in the wellbore. The particle size range of the particles is preselected and the particles are injected in such a manner that the packed particles will allow the flow of the desired fluid (the term being used to include liquids and/or gases) between the formation and the wellbore.

In carrying out a typical wellbore packing operation, a screen is first placed at a position in the wellbore which is within the desired fluid-bearing formation. In completed wells, a perforated steel casing is usually present between the screen and the formation. A slurry of particulate material in a carrier liquid is then pumped into the wellbore so as to place the particulate material between the screen and the casing (or the formation if no casing is present), as well as into the perforations of any casing, and also into any open area which may extend beyond the perforated casing into the formation. Thus, the aim of packing in most cases is to completely fill the area between the screen assembly and the formation with the particulate material. In some cases, this open area is packed with particulate material before placing the screen in the well. Such a technique is often referred to as prepacking such as described in U.S. Pat. No. 3,327,783.

The particulate material is typically gravel having a density ($D_p$) of about 2.65 grams per cubic centimeter ($g/cm^3$). The carrier liquid is generally water with a density ($D_c$) of 1 $g/cm^3$. The gravel particle size range is generally 20 mesh (all mesh sizes, U.S. mesh unless otherwise specified) to 40 mesh (841 microns to 420 microns) or 40 mesh to 60 mesh (420 microns to 250 microns). The resulting density ratio of particulate material to carrier liquid ($D_p/D_c$), is about 2.65/1.

many cases the overall packing efficiency (the percentage of the total volume of all of the area between the screen and the formation that is filled with gravel) is less than 100%. This is particularly true for deviated wells and especially for highly deviated wells (those deviating from the vertical at an angle more than 45 degrees) and horizontal wells. Of course, the lower the packing efficiency, the greater the likelihood of low production of well fluids or low injection rates and/or sand movement from the formation into the wellbore and production string.

In recent times, such as in copending U.S. application Ser. No. 905,355 filed Sept. 9, 1986, now abandoned, it has been suggested that the efficiencies of gravel pack operations can be improved by the use of particulate materials and carrier liquids with more closely matched density ($D_p/D_c$ approaching 1/1), particularly in deviated wellbores. This technique results in improved packing efficiencies for, particularly, the upper portions of the packed interval as well as the top perforations in a highly deviated or horizontal wellbore since the particles are essentially neutrally buoyant in the carrier liquid and thus are transported more efficiently to the top portions of a wellbore and perforations. However, the cost of these specialized materials greatly exceeds the cost of simple sand packing materials.

SUMMARY OF THE INVENTION

The present invention provides a lower cost method for efficiently gravel packing both the lower and upper perforations and portions of the wellbore annulus.

In accordance with the invention, a method for gravel packing a well comprises injecting into a wellbore a slurry of particulate material in a carrier liquid, the particulate material comprising at least first particles having a first density less than the density of the carrier liquid and second particles having a second density which is greater than the density of the carrier liquid. The slurry is strained so that the particles produce a packed mass adjacent the formation, which packed mass will allow flow of fluids therethrough between the formation and the wellbore while substantially preventing particulate material from the formation passing therethrough and into the wellbore.

Further in accordance with the invention, the above method comprises simultaneously injecting the first and second particles.

Still further in accordance with the invention, the above method includes the steps of sequentially injecting the first and second particles.

It is therefore an object of this invention to provide a method whereby the efficiency of gravel packing operations in both upper and lower portions of the wellbore and perforations is greatly increased over prior art methods while lowering the expense of such prior operations of substantially equal efficiency.

It is yet another object of this invention to provide an improved method of inexpensive and efficiently placing a gravel pack in the wellbore and perforations of a highly deviated or horizontal well.

BRIEF DESCRIPTION OF THE DRAWING

The invention will now be described in the more limited aspects of a preferred embodiment thereof and in conjunction with the accompanying drawing forming a part of this specification and in which the sole FIGURE illustrates a model wellbore in which a gravel packing in accordance with the present invention may be placed.

DETAILED DESCRIPTION OF THE PREFERRED EMBODIMENTS AND THE DRAWINGS

In order to ascertain the effects of having particles of differing densities relative to the carrier fluid in a wellbore, a transparent plastic test model was used. The model basically emulated, in plastic, many components of a cased well prepared for packing. The model included an elongated hollow tube serving as a casing 2, with a number of tubes extending radially therefrom, acting as perforations 4. Perforation chamber 6 communicate with each perforation 4. For simplicity, only one perforation 4 and its corresponding chamber 6 is shown in this FIGURE. However, the model had a total of 20 perforations, arranged in 5 sets. Each set consists of 4 co-planar perforations spaced 90 degrees apart from another, the sets being spaced 1 foot apart along a 5 foot section of the hollow tube serving as the casing 2, starting 1 foot from the bottom of the model. Each perforation has a perforation chamber 6 in communication therewith. The model further had a wire screen 8 extending from a blank pipe 10 and a wash pipe 12 extending into the screen 8. The annular space between the screen 8 and the casing 2 defines a screen-casing annulus. The entire model was arranged so that it could dispose at various angles to the vertical.

The particles used in accordance with the invention desirably have a Krumbein roundness and sphercity of at least about 0.5 and, preferably, at least about 0.6; i.e., the particles have a roundness and sphercity as determined by using the chart provided for estimating roundness and sphercity in the *Text Stratigraphy and Sedimentation,* Second Edition, 1963, W. C. Krumbein and L. L. Sloss, published by W. H. Freeman & Company, San Francisco, Calif. U.S.A. The particles have a density within the range of about 0.7 to about 4.0 and, preferably, from about 0.8 to about 2.65. Most preferably, a first particle has a density selected from the lower portion of the density range and the second particle has a density selected from the upper portion of the density range. The particles are preferably each selected from a group consisting of thermoplastic beads prepared from polyolefins, polystyrenedivinylbenzine (SVDB), polyfluoro carbons, polyether etherketones and polyamide imides, ceramic beads, encapsulated ceramic beads, petroleum coke, pyrocarbon-coated ceramics, pyrocarbon-coated petroleum coke, coke, bauxite and sand. The particles used in this process must meet all of the specifications set forth for gravel in accordance with API RP 58.

Of the many liquids which may be used as the carrier fluid, water and/or brines are preferred, either viscosified or unviscosified, but usually the former. The liquid may contain additives for friction reduction which may also act as viscosifiers. Viscosifiers may include any common natural or synthetic viscosifiers such as polysaacharides, modified polysaacharides, acrylamide polymers, viscoelastic surfactants, and the like.

In pumping the different density particles, one preferred method comprises pumping the particles simultaneously as a blend of particles, the low density particles being present in a range of 10 to 90% and the high density particles being present in a range of 90 to 10%. More preferably, in the interest of lowering the overall cost of the gravel pack, an acceptable gravel pack is formed from a mixture of particles wherein the low density particles comprise 25 to 50% of the blend with the high density particles comprising 50 to 75% of the particulate blend.

As an alternative to pumping the particles as a blend, the differing density particles may be pumped separately as distinct slugs of slurry, each slug containing particles having either a low or high density.

In order to determine the pack efficiency of a blend of low density and high density particles, comparative tests were run in the model shown in the FIGURE using sand having a density of 2.65 alone, styrenedivinylbenzine beads alone having a density of 1.05 and a 50-50 mixture of sand and SDVB beads. The particle size was 20 to 40 mesh for the sand and 18 to 50 mesh for the SDVB beads. The results are shown in Table I.

TABLE I

| Description | Sand | 50:50 Sand:SDVB | SDVB |
|---|---|---|---|
| Annulus | 100% | 100% | 100% |
| Perforation | 65 | 95 | 100 |
| Perf. Chamber | 10 | 15 | 54 |

It can be seen that the pack efficiency in the perforations was greatly improved by the substitution of 50% SDVB beads for sand and that such packing efficiency in the perforations was nearly as good as that when 100% SDVB beads were used but utilizing only half of the considerably more expensive SDVB material. High packing efficiency within the perforations relates directly to the ability of the well to produce well fluids while avoiding the production of formation particulates. This test was run with the model inclined at 75 degrees to the vertical with a pump rate of two barrels per minute in a gravel concentration of 2.5 lbs/gal of fluid.

While the invention has been described in the more limited aspects of a preferred embodiment thereof, other embodiments have been suggested and still others will occur to those skilled in the art upon a reading and understanding of the foregoing specification. It is intended that all such embodiments be included within the scope of this invention as limited only by the appended claims.

We claim:

1. A method of packing a well comprising the steps of:
   (a) injecting into the well a slurry of particles in a liquid wherein the particles are a blend of two different density particles wherein a first particle has a first density which is lower than a second density of a second particle, said first and second densities being selected from a particle density range of from about 0.8 to about 2.65 gr/cc, and
   (b) straining the particles of the slurry so as to produce a packed mass of particles adjacent to a formation penetrated by the well, which packed mass will allow the flow of fluids between the formation and the well while substantially preventing particular material from the formation passing therethrough and into the well.

2. The method of packing a well as set forth in claim 1 wherein said one of said two different density particles has a density lower than a density of the liquid and said other of said two different density particles has a density higher than the density of said liquid.

3. The method of packing a well as set forth in claim 1 wherein said one of said two different density particles has a density about equal to a density of the liquid and said other of said two different density particles has a density higher than the density of said liquid.

4. A method of packing a well as set forth in claim 1 wherein said two different density particles are each selected from a group consisting of thermoplastic beads prepared from polyolefins, polystyrene divinylbenzine, polyfluor carbons, polyether etherketones and polyamide imides, ceramic beads, encapsulated ceramic beads, petroleum coke, pyrocarbon coated ceramics, pyrocarbon-coated petroleum coke, coke, bauxite and sand.

5. The method of packing a well as set forth in claim 1 wherein the liquid is unviscosified water.

6. The method of packing a well as set forth in claim 1 wherein the liquid is viscosified water.

7. The method of packing a well as set forth in claim 1 wherein the liquid is unviscosified brine.

8. The method as set forth in claim 1 wherein the liquid is viscosified brine.

9. The method of packing a well as set forth in claim 1 wherein said first particle has a density lower than a density of the liquid and said second particle has a second density which is higher than the density of said liquid.

10. The method of packing a well as set forth in claim 1 wherein said first particle has a first density about equal to a density of the liquid and said second particle has a second density which is higher than the density of said liquid.

11. A method of packing a well comprising the step of:
(a) injecting sequentially into the well first and second fluid slugs containing particles of a first and second density, respectively, in a liquid, said first and second density particles having a particle density range of from about 0.1 to about 4.0 gr/cc, and
(b) straining the particles of the fluid slugs so as to produce a packed mass of particles adjacent to a formation penetrated by the well, which packed mass will allow the flow of fluids between the formation and the well while substantially preventing particulate material from the formation passing therethrough and into the well.

* * * * *